(12) United States Patent
Lawrence et al.

(10) Patent No.: US 8,947,402 B2
(45) Date of Patent: Feb. 3, 2015

(54) TOUCH SENSITIVE IMAGE DISPLAY

(75) Inventors: Nicholas A. Lawrence, Cambridge (GB); Raul Benet Ballester, Cambridge (GB); Adrian J. Cable, Cambridge (GB); James E. G. Wright, Cambridge (GB)

(73) Assignee: Light Blue Optics Ltd, Cambridge (GB)

( * ) Notice: Subject to any disclaimer, the term of this patent is extended or adjusted under 35 U.S.C. 154(b) by 695 days.

(21) Appl. No.: 13/130,742

(22) PCT Filed: Dec. 23, 2009

(86) PCT No.: PCT/GB2009/051770
§ 371 (c)(1),
(2), (4) Date: Jul. 20, 2011

(87) PCT Pub. No.: WO2010/073047
PCT Pub. Date: Jul. 1, 2010

(65) Prior Publication Data
US 2011/0248963 A1 Oct. 13, 2011

(30) Foreign Application Priority Data

Dec. 24, 2008 (GB) .................................. 0823457.7
May 29, 2009 (GB) .................................. 0909313.9
May 29, 2009 (GB) .................................. 0909314.7

(51) Int. Cl.
*G06F 3/042* (2006.01)
*G03H 1/00* (2006.01)
(Continued)

(52) U.S. Cl.
CPC .............. *G06F 3/042* (2013.01); *G03H 1/0005* (2013.01); *G03H 1/2205* (2013.01); *G03H 1/2294* (2013.01); *G06F 1/3231* (2013.01); *G06F 3/0425* (2013.01); *G06F 3/0426* (2013.01); *G06Q 50/12* (2013.01); *G03H 2001/0061* (2013.01); *G03H 2001/2215* (2013.01); *G03H 2001/2221* (2013.01);
(Continued)

(58) Field of Classification Search
None
See application file for complete search history.

(56) References Cited

U.S. PATENT DOCUMENTS 4,384,201 A   5/1983   Carroll et al.
5,498,867 A * 3/1996   Senuma et al. .......... 250/231.18
(Continued)

FOREIGN PATENT DOCUMENTS

DE   41 21 180     6/1991
GB   0822336.4     6/2010
(Continued)

*Primary Examiner* — Joseph Haley
*Assistant Examiner* — Parul Gupta
(74) *Attorney, Agent, or Firm* — Hamilton DeSanctis & Cha

(57) ABSTRACT

We describe a touch sensitive image display device for projecting a touch sensitive displayed image at an acute angle onto a surface on which the device is placed. The device comprises: light sources to project two-dimensional first and second light distributions in respective first and second planes; and a multi-pixel sensor system to remotely detect touch of an area of said surface within or adjacent to the displayed image by detecting light from the first distribution to provide a detected touch signal. The multi-pixel sensor system also remotely detects presence of an object within the second light distribution to provide a detected presence signal. The device is configured to multiplex projection of the first light and second distributions. A controller has an input to receive the detected touch and detected presence signals and is configured to control the device responsive to these signals.

44 Claims, 10 Drawing Sheets

(51) Int. Cl.
  *G03H 1/22* (2006.01)
  *G06F 1/32* (2006.01)
  *G06Q 50/12* (2012.01)

(52) U.S. Cl.
  CPC ... *G03H 2001/2271* (2013.01); *G03H 2210/22* (2013.01); *Y02B 60/1289* (2013.01); *G03H 2210/441* (2013.01); *G03H 2001/2213* (2013.01)
  USPC .......................................................... 345/175

(56) References Cited

U.S. PATENT DOCUMENTS

| | | | |
|---|---|---|---|
| 6,323,942 | B1 | 11/2001 | Bamji |
| 6,367,933 | B1 | 4/2002 | Chen et al. |
| 6,491,400 | B1 | 12/2002 | Chen et al. |
| 7,379,619 | B2 | 5/2008 | Ikeda et al. |
| 7,453,419 | B2 * | 11/2008 | Yee et al. .................. 345/39 |
| 7,907,646 | B2 * | 3/2011 | Mizuuchi et al. ............. 372/21 |
| 8,588,862 | B2 | 11/2013 | Schlomann et al. |
| 2002/0021287 | A1 | 2/2002 | Tomasi et al. |
| 2006/0187199 | A1 | 8/2006 | Lieberman |
| 2007/0222760 | A1 * | 9/2007 | Lieberman et al. ........... 345/168 |

FOREIGN PATENT DOCUMENTS

| | | |
|---|---|---|
| WO | WO 02/101443 | 12/2002 |
| WO | WO 2005/059660 | 6/2005 |
| WO | WO 2006/108443 | 10/2006 |
| WO | WO 2006/134398 | 12/2006 |
| WO | WO 2007/031797 | 3/2007 |
| WO | WO 2007/110668 | 10/2007 |
| WO | WO 2007/141567 | 12/2007 |
| WO | WO 2008/038275 | 4/2008 |
| WO | WO 2008/146098 | 12/2008 |
| WO | WO 2010/073045 | 7/2010 |

* cited by examiner

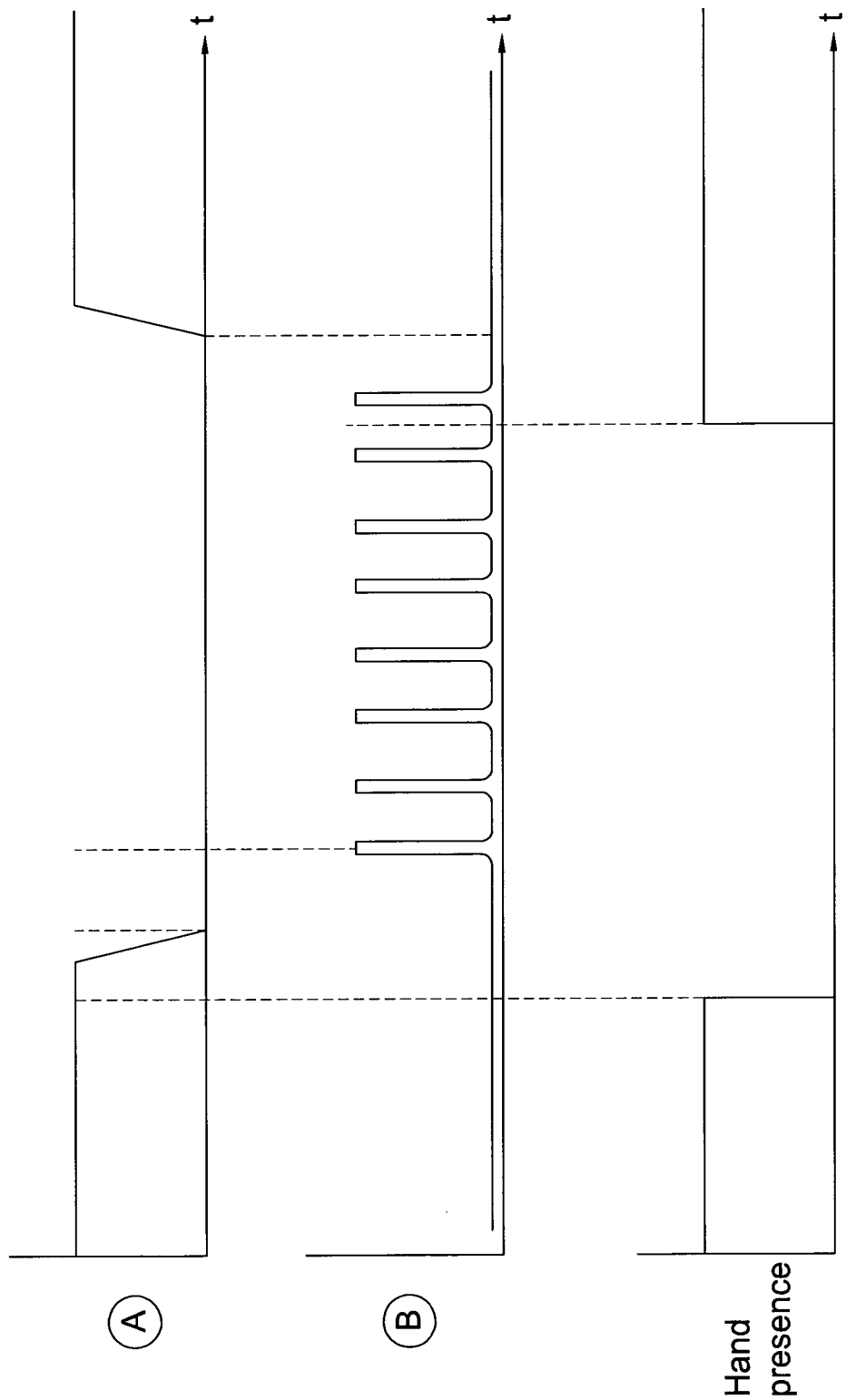

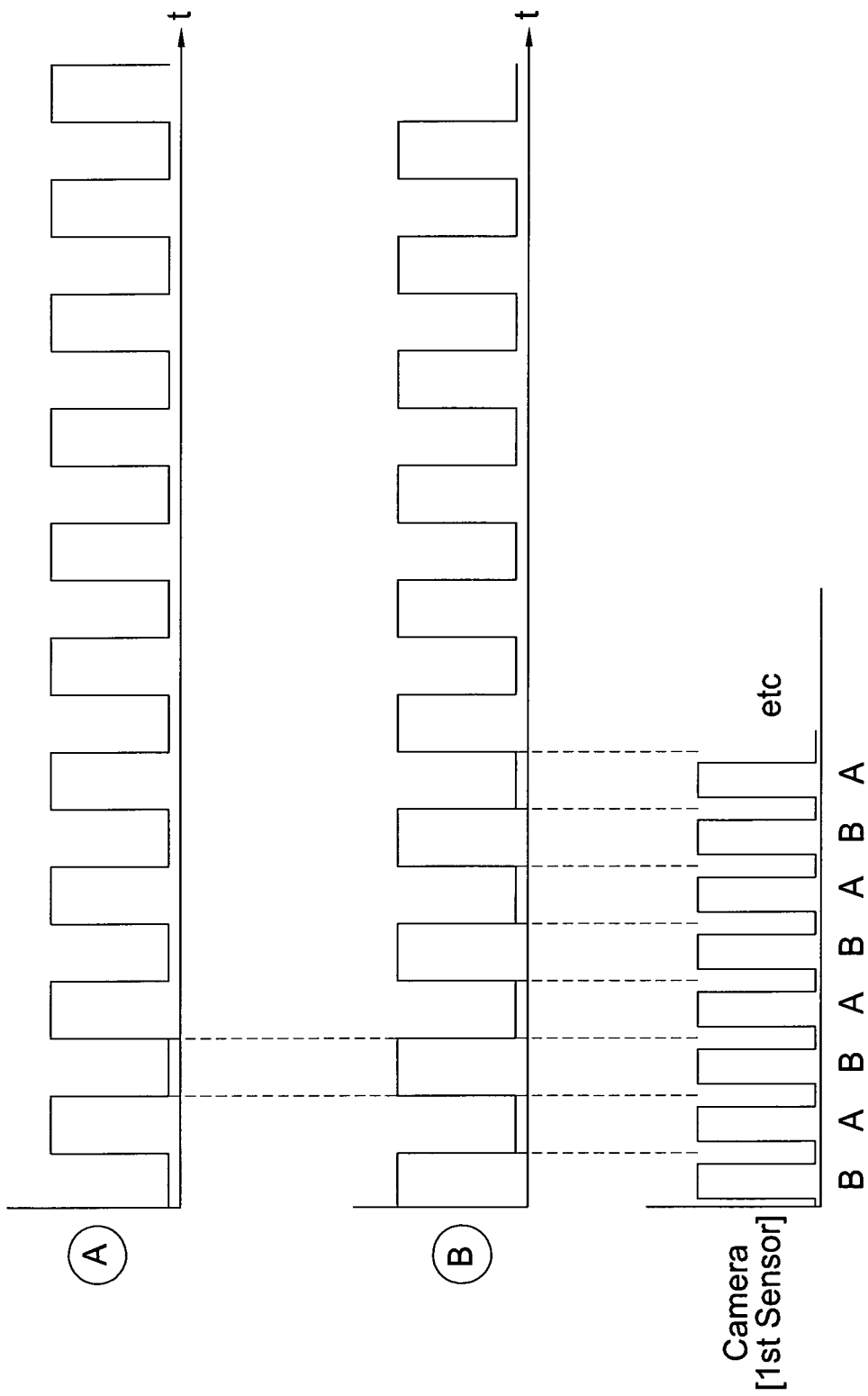

TOUCH SENSITIVE IMAGE DISPLAY

CROSS REFERENCE TO RELATED APPLICATION

This application claims priority to PCT Application No. PCT/GB2009/051770 entitled "Display Devices" and filed Dec. 23, 2009, which itself claims priority to Great Britain Patent Application No. GB0823457.7 filed Dec. 24, 2008, claims priority to Great Britain Patent Application No. GB0909313.9 filed May 29, 2009, claims priority to Great Britain Patent Application No. GB0909314.7 filed May 29. 2009. The entirety of each of the aforementioned applications is incorporated herein by reference for all purposes.

BACKGROUND OF THE INVENTION

This invention generally relates to a touch sensitive display device and to a consumer electronic device comprising such a device.

We have previously described techniques for displaying an image holographically—see, for example, WO 2005/059660 (Noise Suppression Using One Step Phase Retrieval), WO 2006/134398 (Hardware for OSPR), WO 2007/031797 (Adaptive Noise Cancellation Techniques), WO 2007/110668 (Lens Encoding), and WO 2007/141567 (Color Image Display), and GB application GB0823457.7 filed on Dec. 24, 2008 (Holographic Image Display Systems). These are all hereby incorporated by reference in their entirety.

Projecting downwards and outwards onto a flat surface such as a tabletop entails projecting at an acute angle onto the display surface (taking this as the angle between the centre of the output of the projection optics and the middle of the displayed image—this angle, to a line in the surface, is less that 90°). We conveniently refer to this as "table down projection". Table down projection is not readily achievable by conventional image display techniques; scanning image display systems have a narrow throw angle and thus find it difficult to achieve a useful image size whilst projection systems, especially those based on LEDs (light emitting diodes) which have a wide light output angle, find it difficult to achieve a useful depth of field. Moreover table down projection can often involve very substantial distortion of an image which can result in inefficient use of the area of an image display device, resulting in major reductions in image brightness and overall system efficiency. Background information relating to compensating for keystone distortion in an LCD projector can be found in U.S. Pat. No. 6,367,933 (WO00/21282); further background prior art can be found in: WO02/101443; U.S. Pat. No. 6,491,400; and U.S. Pat. No. 7,379, 619.

Holographic image display techniques are described in our UK Patent Application number GB0822336.4 filed on 8 Dec. 2008 hereby incorporated by reference in its entirety.

Background prior art relating to touchsensing can be found, for example, in patent applications filed by Lumio Inc (such as WO2008/038275) and VKB Inc (such as US2007/222760), as well as in patent/applications filed by Canesta Inc (for example U.S. Pat. No. 6,323,942), and patent applications filed by Sensitive Object (such as WO2006/108443 and WO2008/146098).

Hence, for at least the aforementioned reasons, there exists a need in the art for advanced systems and methods for display.

BRIEF DESCRIPTION OF THE DRAWINGS

This invention generally relates to a touch sensitive display device and to a consumer electronic device comprising such a device.

FIG. 3b shows a more detailed block diagram of an embodiment having features discussed in relation to FIGS. 1-2 and 3a;
FIG. 4 shows a timing diagram for illustrating a first mode of operation of an embodiment;
FIG. 5 shows a timing diagram of multiplexing of detection in the time domain in an embodiment.

BRIEF SUMMARY OF THE INVENTION

Figure 1:
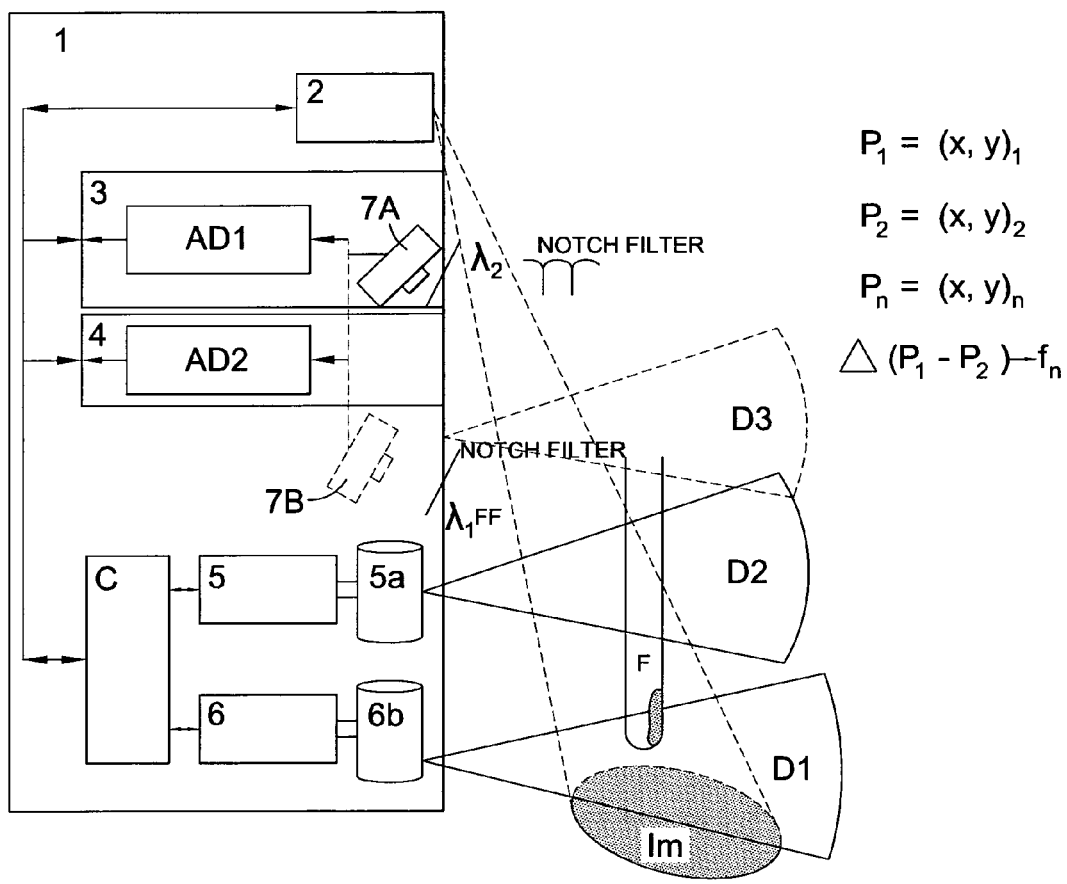
FIG. 1 shows a display device of an embodiment.

This invention generally relates to a touch sensitive display device, a consumer electronic device comprising such a device, and to a consumer electronic device having a touch sensitive user interface.

The inventors have further recognized that "tabledown" projectors of the type we have previously described can be combined with touch sensing technology to provide a touch sensitive image display with many advantages, including where the image display technique is non-holographic or holographic.

Multiplexed Systems

According to a first aspect of the present invention, there is provided a touch sensitive image display device for projecting a touch sensitive displayed image at an acute angle onto a surface on which the device is placed, the device comprising: a light source to project a substantially two-dimensional first light distribution in a first plane; a light source to project a substantially two-dimensional second light distribution in a second plane, wherein said second plane is different to said first plane; a multi-pixel sensor system to remotely detect touch of an area of said surface within or adjacent to said displayed image by detecting light from said first distribution, and having an output to provide a detected touch signal; said multi-pixel sensor system to remotely detect presence of an object at least partially within said second light distribution by detecting light from said second distribution, and having an output to provide a detected presence signal; and said controller having an input to receive said detected touch signal and an input to receive said detected presence signal and configured to control said touch sensitive image display device responsive to said signals, wherein said device is configured to multiplex projection of the first light distribution and projection of the second light distribution.

Advantageously, an embodiment of the first aspect may allow a reduction in the number of components required for a touch sensitive image display device. This may be the case where the projection multiplexing is in the time domain so that, e.g., the light sources may be the same light source, i.e., a single light source is used to project both distributions. Similarly, this may be the case where light of different wavelengths obtained from a single broadband light source is used to project both distributions. This may be achieved using filters.

The or each multi-pixel sensor system may comprise one or more multi-pixel sensors such as a camera or CCD array. In particular, a multi-pixel sensor allows detection of location of touch or presence. (Any one of the sensors described herein may indicate light intensity and/or location, and may further give an indication of received light intensity for judging a distance, the output for intensity being binary, M-ary (where M>2) or analogue).

Here and in the description below the or each substantially two-dimensional first distribution in embodiments defines a substantially laminar distribution, for example having a divergence in a vertical plane of less than 10o, 5o or 2o.

To protect the touch sensitive displayed image, the display device may comprise image projection element(s). This may comprise a projector, in particular one having an input to receive data defining the displayed image. Furthermore, the displayed image may change dynamically in response to the touch and/or presence detections. This may be achieved using a spatial light modulator (SLM), which may for example be a liquid crystal device pixellated device such as a LCOS (liquid crystal on silicon) device and may be a transmissive or reflective device. More specifically, the device may comprise an SLM, image projection optics comprising at least one light source to illuminate the SLM, and output optics to project modulated light from the SLM onto the surface at the acute angle. Furthermore, in any embodiment, the light source of the image projection element(s) may comprise a coherent light source, a light emitting diode, a filament lamp and/or a fluorescent lamp.

However, holographic projection may be advantageous for obtaining a longer depth of field, a wider throw angle, and/or very substantial distortion correction without substantial loss of brightness/efficiency, compared to with non-holographic projection, and this may require the light source of the image projection element(s) to be a coherent light source such as a laser. In such an embodiment, the device having the SLM may have holographic image projection optics as the image projection optics mentioned above, the light source to illuminate the SLM may comprise a coherent light source and the modulators light is then the coherent light, and the display device may then be configured to holographically project a touch sensitive displayed image at the acute angle. Thus an image displayed on a pixellated SLM itself may be a hologram.

In particular embodiments, the responsive control may be to "wake up" an element of the display device upon receiving a touch and/or presence signal. For example, one of the light sources may be switched on or the power emitted therefrom increased, or a screen saver or further (e.g., sub-) image may be displayed over a portion of the displayed image or adjacent thereto.

There may further be provided the above touch sensitive image display device, comprising: at least one further light source to project a further substantially two-dimensional second light distribution in a further plane, wherein said further plane is different to each other said plane; and at least one further multi-pixel sensor system, each said further multi-pixel sensor system to remotely detect presence of an object at least partially within at least one said further light distribution by detecting light from said at least one further distribution, and having an output to provide a detected presence signal.

Thus, there may be any number of second light distributions. This may advantageously allow presence sensing on multiple levels. Particularly advantageously, each of the first, second and further planes is different in that they do not substantially coincide, even if, for example, any of the planes intercept. Preferably, the distributions are stacked one above the other, preferably substantially parallel to the surface where the image is displayed.

There may further be provided the above touch sensitive image display device, wherein said device is configured to multiplex projection of the first light distribution, the second light distribution and at least one said further light distribution.

Thus, similarly as described above in relation to time and wavelength, detections relating to each distribution may occur in a predetermined sequence where the multiplexing is in time, and/or a shared light source may be used for each distribution. Further similarly, the light distributions may be projected using different wavelengths derived from a shared broadband light source.

There may further be provided the above touch sensitive image display device, wherein said multi-pixel sensor system to detect touch comprises a plurality of multi-pixel sensors each to remotely detect touch of an area of said surface within or adjacent to said displayed image, and having an output to provide a detected touch signal.

Thus, where more than one multi-pixel sensor is used, it may advantageously be possible to detect two or more simultaneous touches, especially if one touching object (e.g. finger) is hidden behind the other and the touch sensors sense touching of the displayed image from different angles/view points/locations. Furthermore, multiple sensors may allow sensing of relative movement, distance or direction of touches such as the bringing of two fingers together to perform an action responsive to relative position, speed or direction.

There may further be provided the above touch sensitive image display device, wherein said multi-pixel sensor system to detect presence comprises a plurality of multi-pixel sensors each to remotely detect presence of an object at least partially within said second light distribution, and having an output to provide a detected presence signal.

Similarly as described above in relation to simultaneous detection of more than one touch, the use of multiple multi-pixel sensors to detect presence may allow simultaneous detection of more than one presence especially regarding the above hidden scenario and may be advantageous in relation to the above relative movement/distance/direction of presences.

There may further be provided the above touch sensitive image display device, wherein said light source to project said first light distribution is said light source to project said second light distribution. Thus, the light sources may comprise a shared light source. The or each light source may be an infrared light source or may emit visible light.

There may further be provided the above touch sensitive image display device, wherein said first plane and said second plane are substantially parallel planes. For example, when the second plane is 'above' the first plane when the touch sensitive image display device is in use ('above' assumes the displayed image and surface are 'below', even when the direction of projection is not downwards as such), the second distribution may be located, e.g., about 1 to about 2 centimetres above the first distribution. Thus, the first and second light distributions may be substantially parallel. However, preferably, the distributions are at least non-intersecting.

There may further be provided the above touch sensitive image display device, wherein said multiplexing is wavelength multiplexing. Additionally or alternatively, there may be provided the above touch sensitive image display device, wherein said multiplexing is time multiplexing.

For the wavelength multiplexing, the first and second light distributions may be projected using different respective wavelengths, e.g., wavelength division multiplexing, e.g., using different infra-red wavelengths emitted from the first and second light sources.

Regarding the above time multiplexing, this may be such that, when the first light distribution is being projected, the second light distribution is not being projected. Where such multiplexing occurs, each light source may be pulsed on when no other of the light sources to project a distribution is on. The controller may be configured to control the timing of the emission from the light sources or of projecting the distributions (in the case of a shared light source). In such cases, the input to receive the output to provide a detected touch signal may be the input to receive the output to provide a detected presence signal. In other words, the detected touch signal and detected presence signal may be provided on the same input line. Of further advantage to a time multiplexing embodiment, there may be provided the above touch sensitive image display device, wherein said responsive controller is configured to read said detected touch signal and said detected presence signal in synchronism with said time multiplexing. Thus, the controller may be configured to read in the signal at a predetermined instant of time when the first distribution is being projected and when a valid touch signal may be available. Similar applies to reading in the detected presence signal. In particular, the controller may read the touch and presence signals alternatively and may further be control the synchronism detection using a phase locked loop (PLL). The use of a PLL may further enable a detection signal to be filtered out having the same frequency as a particular corresponding distribution projection. This may advantageously reduce the signal-to-noise ratio of detection input signals.

There may further be provided the above touch sensitive image display device, wherein the controller is configured to perform said responsive control by distinguishing between said receiving of said detected touch signal and said receiving of a detected presence signal on the basis of a timing of receiving a said signal.

There may still further be provided the above touch sensitive image display device, configured to determine an action to be initiated by said responsive control on the basis of said distinguishing. Thus, for example, a particular action may be selected when a corresponding location of the displayed image is touched and/or a different action (e.g., wake up or power up of a light source) may be selected when presence is detected.

There may yet further be provided to the device the above touch sensitive image display device, further comprising moveable optics to alternately project said first light distribution and said second light distribution. In such an embodiment, the moveable optics may comprise a rotatable or tiltable mirror.

There may further be provided the above touch sensitive image display device, wherein said multi-pixel sensor system to detect touch is to detect a location of said touch and said responsive control performs an action determined on the basis of said detected touch location and controls said device to perform said action.

The detected touch location may be provided as coordinate values, e.g., (x,y), or as pixel identifiers indicating the pixels of a multi-pixel sensor that detected a change in a light distribution resulting from the touch. Determining the action on the basis of the location may involve applying a reverse distortion to map the actual detected location onto a corresponding location in the original preferably un-distorted input image. This may compensate for distortion resulting from the acute angle.

Similarly, there may be provided the above touch sensitive image display device, wherein said multi-pixel sensor system to detect presence is to detect a location of said presence and said responsive control performs an action determined on the basis of said detected presence location and controls said device to perform said action. Again, coordinates or pixel identifiers and distortion compensation may be applied.

There may further be provided the above touch sensitive image display device, wherein the action comprises selecting a menu on the basis of said detected presence location and displaying said selected menu. This is of particular advantage where an action is determined on the basis of a detected touch/presence location as described above. Thus, context-sensitive menus may be displayed.

There may be further provided the above touch sensitive image display device, wherein the sensor system to detect touch is configured to detect light scattered from said first light distribution. Similarly, there may be provided the above touch sensitive image display device, wherein said sensor system to detect presence is configured to detect light scattered from said second light distribution.

Alternatively, the above detected light in either case may have been, e.g., reflected or diffracted by an object in the distribution. Further alternatively, the detection may occur by detecting attenuation of light received in the sensor system due to the presence of an object attenuating or blocking a portion of light in the distribution. The object may be for example the user's finger or a stylus or any other object that is touching the displayed image or the surface area on which the image is displayed.

There may further be provided the above touch sensitive image display device, wherein said controller is configured to detect hovering of a said object by detecting absence of a said touch detection and occurrence of a said presence detection on the basis of said signals. Thus, responsive actions may be performed on the basis the action of hovering as to opposed to touching and even advantageously on the basis of the location or movement of the hovering object within a second or further distribution. Hovering may correspond to a user remaining present but having paused manual action so that the finger or other object remains suspended, e.g., in the second distribution.

There may still further be provided the above touch sensitive image display device, further comprising a spatial light modulator (SLM) and a controller to control said SLM, on the basis of data defining said displayed image, to replay a target image distorted to compensate for projection onto said surface at said acute angle.

Thus, the controller may process input data defining the (preferably un-distorted) image to be displayed to generate data suitable for modulation of the SLM to project the image such that the image as projected on the surface appears substantially un-distorted. The replay of the target image may mean driving a pixellated SLM according to target image data. The acute angle may mean an angle of less than 90 degrees to the surface where the image is displayed (this applies throughout the present specification). Data defining an image for display may comprise data defining at least one image for display on an SLM to replay a target image distorted to compensate for projection onto the surface at the acute angle.

There may further be provided the above touch sensitive image display device, wherein a multi-pixel sensor of said multi-pixel sensor system to detect touch is a multi-pixel sensor of said multi-pixel sensor system to detect presence. Thus, the two systems may share a multi-pixel sensor. In this case, the touch sensor system may comprise at least one pixel of a multi-pixel sensor and the presence sensor system may comprise at least one other pixel of the shared multi-pixel sensor. At least one pixel of the presence sensor may have a greater optical aperture than the at least one pixel of the touch sensor. Thus, the touch sensor system may use a substantially central portion of the multi-pixel sensor while the presence system may use boundary pixels of the sensor, and those pixels used for presence detection may be larger than the central ones, i.e., have greater optical aperture and thus provide lower resolution detections.

There may further be provided the above touch sensitive image display device, wherein said multi-pixel sensor system to detect touch is configured to use pixels of said multi-pixel sensor and said multi-pixel sensor system to detect presence is configured to use other pixels of said multi-pixel sensor. This is broadly consistent with the description above concerning a shared sensor. Furthermore, this allows the presence detection to detect proximity or movement towards (approach) the displayed image, particularly if the pixels used for touch detect light scattered only from touching the displayed image but the pixels used for presence detect light scattered only from near the displayed image.

According to a second aspect of the presence invention, there is provided a consumer electronic device such as a camcorder, camera, music player, mobile phone, media player or computer, comprising the above touch sensitive image display device. For example, when implemented in a camcorder, the acute angle projection may allow preview of a recorded video stream to be observed on a surface on which the camcorder is placed.

According to a further aspect of the present invention, there is provided a method corresponding to the above first aspect, optionally with any combination of the above features which may be provided in the first aspect.

According to a further aspect of the present invention, there is provided a method corresponding to the above second aspect, optionally with any combination of the above features which may be provided in the second aspect.

Joystick-type Control

According to another aspect of the present invention, there is a provided a touch sensitive image display device for projecting a touch sensitive displayed image at an acute angle onto a surface on which the device is placed, the device comprising: a light source to project a first light distribution; a light source to project a second light distribution; a multi-pixel sensor system to remotely detect location of touch of an area of said surface within or adjacent to said displayed image by detecting change of said first distribution, and having an output to provide a detected touch location signal; a multi-pixel sensor system to remotely detect location of an object at least partially within said second light distribution, and having an output to provide a detected object location signal; a controller having an input to receive said detected touch location signal and an input to receive said detected object location signal, and configured to control said device responsive to said detected touch location signal and to control said device responsive to said detected object location signal. Advantageously, an embodiment may thus provide a user interface for touch and presence detection which may use respective light distributions at different levels 'above' the displayed image and surface (taking the displayed image and surface as being 'below', even if the projection is not downwards as such), and further advantageously with more than one presence detection distribution (i.e., a plurality of further light distributions that enable presence detections in the same manner as for the second distribution). Particularly advantageously, such an interface may allow a user to control the device by presence or movement in different layers, the actions performed by the device in response to the user's control advantageously depending on which particular light distribution the user touch/presence is detected in. Moreover, the user interface may allow the user to control the device at least similarly as when using a joystick, the user being able to achieve this merely by use of his finger or a stylus, for example.

For projecting the displayed image, the display device may further comprise an image projection element(s) such as a projector. The device may further have a spatial input for receiving data defining the displayed image. Furthermore, and particular where a spatial light modulator (SLM)), which may for example be a liquid crystal device pixellated device such as a LCOS (liquid crystal on silicon) device and may be a transmissive or reflective device, is provided in the display device, a dynamic image may be displayed, i.e., the displayed image may change or be updated (e.g., scrolled, panned, zoomed) in response to detection of touch and/or presence (or movement thereof).

Thus, the above touch sensitive image display device may further comprise an SLM, image projection optics comprising at least one light source to eliminate the SLM, and output optics to project modulated light from the SLM onto the surface at the acute angle. The projector may have at least one light source comprising a coherent light source, a light emitting diode, a filament lamp and/or fluorescent lamp. However, it may be advantageous to use a holographic projector, and this may require a coherent light source such as a laser. For the holographic projector, the above image projection optics may be a holographic image projection optics, the light source to illuminate the SLM may comprise a coherent light source so that the modulated light is coherent light, and the touch sensitive image display device may then be configured to holographically project a touch sensitive displayed image at the acute angle. Thus, the image displayed on the SLM itself, which may be pixellated, may then be a hologram. Where an SLM is used in a holographic or non-holographic embodiment, data defining an image for display may comprise data to define at least one image for display on the SLM to replay a target image distorted to compensate for projection onto the surface at the acute angle. Advantages of holographic projection in an embodiment may include a wider throw angle, longer depth of field, and/or very substantial distortion correction without substantial loss of brightness/efficiency, compared to a non-holographic embodiment.

Further considering the above first aspect, the or each light source may include projection optics such as a lens which may be, e.g., cylindrical, holographic or lenticular. This is particularly advantageous where the or each light distribution is substantially two-dimensional e.g. a sheet distribution.

When the display device is in use, the second light distribution may be above the first light distribution. Compared to the case where they are on the same level, this may be advantageous in avoiding any need to perform a touch to initiate an action (e.g., to wake the device up or an element of the touch sensing system such as the light source for the first light distribution). Preferably, the first light distribution is very close to the surface where the image is displayed, for example less than about 3 mm above the surface. The first distribution is advantageously sufficiently close to the surface that the user feels that the device is controllable by touching rather than by merely positioning an object in the first distribution. The second distribution may be about 1 to about 2 cm above the first distribution.

Further regarding the first aspect, the use of a multi-pixel sensor system may allow the location of a touch or of a presence to be detected. Such a location may be provided from the system as identifiers of pixels detecting light from the object or may be co-ordinate values e.g. (x,y). The or each image detection may be achieved by detecting light scattered, reflected or diffracted from a light distribution. Thus, for example, the remote touch detection may detect light of the first distribution that has been re-directed. Alternatively, a detection of attenuation by booking or attenuating of light of the distribution may be performed. (Any one of the sensors described herein may indicate light intensity and/or location, wherein any such indication of intensity may be binary, M-ary (where M>2) or analogue). There may further be provided the above touch sensitive image display device, wherein at least one said output to provide a detected location signal is configured to indicate a light distribution of said location detection. The outputs may be physically separate outputs, in which case the indication of distribution may be at least implicit from the physical output on which the signal appears. If the outputs are provided on the same signal line, an identifier of distribution may be explicitly provided with the signal. Thus there may be one output signal line indicating the detection signal and the particular distribution in which the object was detected (e.g., by providing a detection indicator and a distribution identifier), or the distribution may be determined by timing of the detection signal if the projections of light distributions are multiplexed in time in a pre-determined sequence. Alternatively, there may be one output signal line per distribution. The provided detected location signal configured to indicate the light distribution may be the detected touch location signal or the detected presence location signal.

There may further be provided the above touch sensitive image display device, comprising: at least one light source to project at least one further light distribution; said multi-pixel sensor system to remotely detect location of an object at least partially within the or each said further light distribution, and having at least one output to indicate a said further distribution and to provide a signal indicating a said location of said object in said indicated further distribution. The or each of the at least one light sources may then include projection optics such as a lens, which may be, e.g., cylindrical, holographic or lenticular, particularly advantageously for providing a substantially two-dimensional distribution such as a sheet distribution.

The feature of projecting at least one further light distribution may mean that any number of lights distributions can be provided and used similarly to the above second light distribution for detecting presence. In this regard, there may be provided one physical light source for further distribution or at least some further distributions may share the same physical light source. The provision of the multi-pixel sensor system may allow detection of location of presence in the or each further light distribution. The system may then comprise one multi-pixel sensor per further light distribution or such a sensor may be shared for detections in different distributions, for example, where multiplexing is used. The indication of further distribution may be achieved by an output on a signal line indicating the detection and a distribution identifier, or the distribution may be determined by timing of the detection signal on the signal line if the projecting of light distributions is multiplexed in time in a predetermined sequence.

There may further be provided the above touch sensitive image display device, wherein the controller is configured to select an action on the basis of at least one of said signals, and to control said touch sensitive image display device to perform said action. The at least one signal may comprise a detected touch location signal, a detected object location signal relating to the second distribution, or detected object location signal(s) relating to any further distribution.

In such a touch sensitive image display device, the controller may be configured to select said action further on the basis of at least one said indication of light distribution. This may as advantageously allow control of the display device by the user moving an object such as his finger in different levels/layers corresponding to distributions of the user interface.

Particularly advantageously, there may be provided the above touch sensitive image display device, wherein said touch sensitive image display is operable by a user's finger as a joystick. Thus, the light sources sensor systems and controller may detect and respond to movement of the user's finger or stylus or similar object in a joystick like manner.

There may further be provided the above touch sensitive image display device, wherein the touch is a touch by a user's finger or other object. Similarly, the object may be a user's finger or other object. As an alternative to the user's finger in either case, the user may use a stylus or pen or other stick-like object or any other object instead of his finger.

Still further, there may be provided the above touch sensitive image display device, wherein the controller is further configured to perform a said responsive control on the basis of a rate of change of at least one said detected location. The detected location may be the location of a touch and/or object presence, in any combination of the first, second and further distributions. This further applies to the above touch sensitive image display device, wherein the controller is further to configured to perform a said responsive control on the basis of a direction of change of at least one said detected location.

There may further be provided the above touch sensitive image display device, wherein the controller is further configured to perform a said responsive control on the basis of a locus of change of at least one said detected location. Again, the detected location may be of a touch or an object presence, in any combination of the distributions.

Furthermore, there may be provided the above touch sensitive image display device, wherein the controller is further configured to perform a said responsive control on the basis of difference between two said detected locations.

Furthermore, there may be provided the above touch sensitive image display device, wherein the controller is further configured to perform a said responsive control on the basis of a rate of change of difference between two said detected locations.

There may further be provided the above touch sensitive image display device, wherein a said responsive control controls said touch sensitive image display device to update or move at least a portion of said displayed image.

Furthermore, there may be provided the above touch sensitive image display device, wherein a said responsive control controls said touch sensitive image display device to display a further image adjacent to or at least partially overlapping said displayed image. Such a further image may be a sub-image at least partly within the displayed image. Such a sub-image may be, e.g. a menu or button (e.g. stop, start, fast forward, rewind, etc.). Furthermore, the further image may replace at least a portion of the displayed image or be displayed in a water mark style with the displayed image. The further image may substantially replace the entire displayed image. For example, if the further image fully overlaps the displayed image, the further image could be a low-power screen saver, the further image being adapted to reduce the required projection power relative to a higher complexity image.

There may further be provided the above touch sensitive image display device, wherein a said multi-pixel sensor system comprises at least one multi-pixel sensor. The multi-pixel sensor system may be the touch system or the object location system or both, and the multi-pixel sensor there may be a camera or CCD array or any other means for detecting a location.

There may further be provided the above touch sensitive image display device, wherein a said sensor of said multi-pixel sensor system to detect touch is a said sensor of said multi-pixel sensor system to remotely detect location of an object. The systems may each comprise a sensor shared with the other system. Furthermore, where each system comprises a single sensor, there may be only one sensor provided in the display device for all sensing. This may apply similarly where further distributions are used as described above.

There may further be provided the above touch sensitive image display device, further comprising an anti-distortion system to map a said detected location of touch to a portion of said input image. The said touch or object location and/or the portion may correspond to one or more pixels of the input image.

There may further be provided the above touch sensitive image display device, wherein at least one said light source is another of said light sources. The light source may comprise any combination of the light sources projecting the first, second or any further distribution. Thus, there may be fewer light sources than distributions, and even a single light source for projecting all distributions, if the distributions are multiplexed in wavelength or time.

Any combination of the sources may comprise an infra-red light source. In this case, either or both of the sources (and/or the sensors or shared sensor) may have a filter to pass infra-red but not visible light. At least two light sources may emit light at different wavelengths. In particular, different infra-red wavelengths may be used for each light source so that the distributions can be used simultaneously. Any number of light sources (and/or the sensors or shared sensor) may comprise a filter e.g. a notch filter, for passing a pre-determined wavelength.

According to a second aspect of the present invention, there is provided a consumer electronic device such as a camcorder, camera, music player, mobile phone, media player or computer, comprising the touch sensitive image display device according to any preceding claim. For example, a camcorder may use the display device to allow a user to preview a recorded video sequence by observing and image projected at an acute angle from the camcorder onto a surface on which the camcorder stands.

According to a further aspect of the present invention, there is provided a method corresponding to the above first aspect, optionally with any combination of the above features which may be provided in the first aspect.

According to a further aspect of the present invention, there is provided a method corresponding to the above second aspect, optionally with any combination of the above features which may be provided in the second aspect.

Thus the invention generally provides methods corresponding to the above-described devices, and processor control code, in particular on a carrier, to implement the methods.

The carrier may be, for example, a disk, CD- or DVD-ROM, or programmed memory such as read-only memory (Firmware). The code (and/or data) may comprise source, object or executable code in a conventional programming language (interpreted or compiled) such as C, or assembly code, for example for general purpose computer system or a digital signal processor (DSP), or the code may comprise code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

The skilled person will appreciate that features of the above-described aspects and embodiments of the inventions may be combined.

In conclusion, the invention provides novel systems, devices, methods and arrangements for display. While detailed descriptions of one or more embodiments of the invention have been given above, no doubt many other effective alternatives will occur to the skilled person. It will be understood that the invention is not limited to the described embodiments and encompasses modifications apparent to those skilled in the art lying within the spirit and scope of the claims appended hereto.

DETAILED DESCRIPTION

This invention generally relates to a touch sensitive display device and to a consumer electronic device comprising such a device.

The following describes an embodiment of a touch sensitive image display device. The embodiment includes a projector for projecting a touch sensitive displayed image at an acute angle onto a surface on which the device is placed. The acute angle is generally less than 90° from the surface where the image is displayed. The angle may be pre-determined or may be adjustable by, for example, moveable optics. The projection optics may comprise a Texas Instruments (registered trademark) digital light processor, a LCOS imager and/or a laser scanner. Furthermore, there may be a projection lens that is moveable or set at a pre-determined angle for projecting the image. Optionally, the image may be projected indirectly to the surface, by first projecting the image to a mirror attached to the housing of the projector, the mirror being arranged to be further from the surface than the projector itself so that the resulting displayed image may be larger.

The projector projects the image on the basis of data defining a desired image. The data may be received in an image processor of the projector from a data input receiving data from a source internal or external to the display device. Furthermore, the image processor may have code for calculating a target image for projection, such that the displayed image as observed by the user does not suffer distortion resulting from the acute angle. Additionally or alternatively, such anti-distortion calculations may account for distortion due to curvature of the surface on which the image is displayed. Such compensation may be carried out by forward or reverse mapping between the (preferably undistorted) input image data and the target image, and may involve cropping of image data. (In alternative embodiments, the acute angle projection may be achieved by providing a stand for supporting the display device or at least the projector though at a pre-determined or adjustable angle.

Specifically regarding compensating for curvature, the projector may be used to scan, e.g., known shapes, patterns and/or lines onto a surface and any described multi-pixel sensing system may be operated 'synchronously' to capture an image to correlate. The captured images may be used to compute a 3-D surface profile. The profile information may then be used to create a correction function, e.g., look-up table, for images projected onto that surface.

FIG. 1 shows the display device 1 comprising a projector 2, sensor systems 3 and 4, light source 5 associated with output optics 5a and light source 6 associate with output optics 6a. (Alternatively, the sensor systems 3 and 4 may be combined such that a single sensor 7a or 7b with optional anti-distortion processor AD1, AD2 can be shared for both presence and touch sensing. This is shown by the dashed lines in FIG. 1, particularly in relation to the anti-distortion units AD1 and AD2 which may be comprised in the sensor system(s) or in the controller C). FIG. 1 further shows that the light source 6 projects a first light distribution d1 over the displayed image Im, and light source 5 projects a second distribution d2' over the first distribution. The first distribution is preferably less than about 3 mm from the surface where the image is displayed and the second distribution d2 may be about 1 to about 2 cm above the first distribution. (FIG. 1 further shows that a further distribution, or any number of further distributions d3, may be used to allow detections at different levels above the displayed image).

Regarding the user interface, FIG. 1 shows that a finger f may be detected touching the displayed image on the basis of sensing light from the first distribution d1. Similarly, presence of the finger f in the distribution d2 may be detected, and this applies further to any further distributions d3. Thus, the user may be able to control the device by "touching" at different levels. Furthermore, detection using the distribution d2 can be used to protect proximity or approach towards the displayed image. In more detail, regarding the equations shown in FIG. 1, the difference between two positions such as p1 and p2, which positions are detectable by sensors 7a and 7b if these are multi-pixel sensors, may result in the selection of a function to be performed by the controller c. The positions may be locations of touch or presence in one particular distribution or may be locations in different distributions. In this way, a versatile user interface may be provided such that, for example, the user can control the device in a joystick-like manner by using his finger, a stylus, pen, etc.

Figure 2:
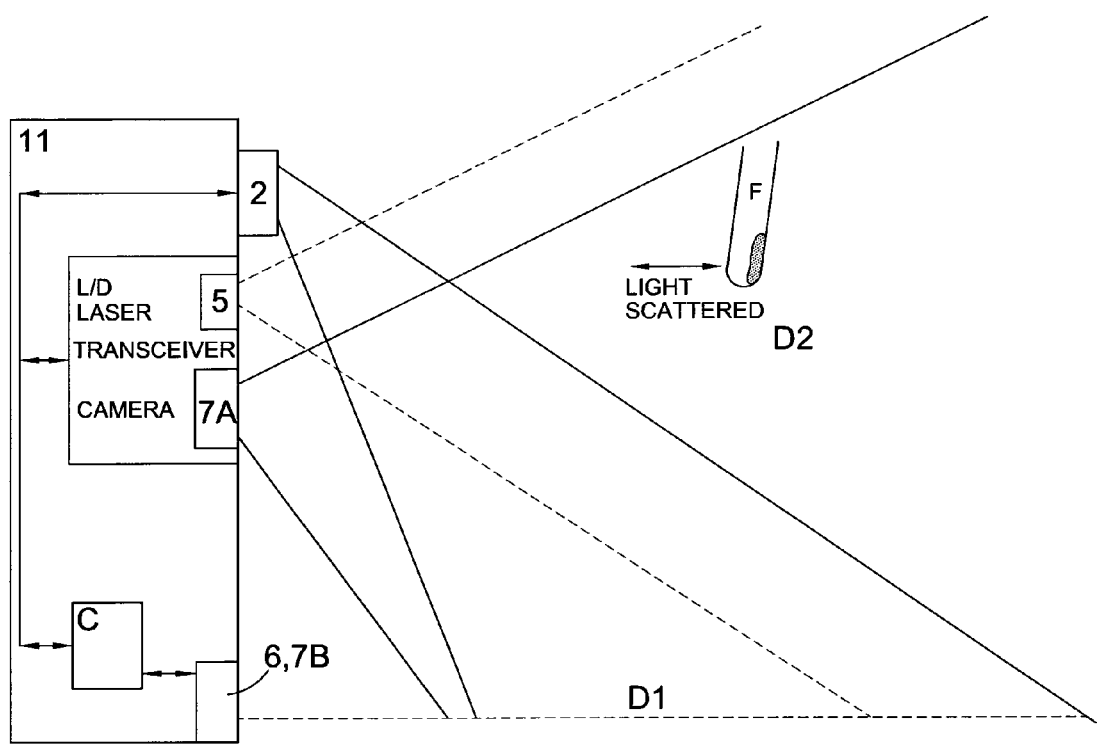
FIG. 2 shows a display device of an embodiment.

FIG. 2 shows an embodiment of a display device 11 with corresponding elements as described above in relation to FIG. 1. Specifically, FIG. 2 shows that the combination of light source 5 (with any required output optics 5a) and sensor 7a may be provided in the form of a transceiver, including, e.g., a laser and camera. Moreover, the embodiment of FIG. 2 illustrates that the second optical distribution d2 may be a three-dimensional volume such as a cone. As with FIG. 1, sensors 7a and 7b may detect light reflected or scattered from an object such as finger f. Particularly in the case where the sensor 7a is a low resolution sensor such as a single pixel sensor, the embodiment of FIG. 2 may provide a less complex apparatus when it is merely required to detect whether or not an object is near, i.e., proximate to a displayed image, whether this is for allowing power management, an improved user-interface or even for safety (e.g., if any light source such as that of the projector is a laser). This may be achieved by detecting the intensity of light scattered from an object. A suitable action taken by the controller c in response to such a detection may be to turn on any element of the device 11, such as the light source 6 and/or projector 2 (in particular the light source of the projector). For example, the touch sensing system may be disabled when a user is not interacting with the display device.

Thus, as in any one of the embodiments of the present invention described herein, power hungry devices may be switched on, or at least have their power increased, only when proximity is detected. Similarly, a further, e.g., sub-, image can be displayed with the above-mentioned displayed image in response to the detection. For the power management, it is further noted that absence of detections of touch and distribution d1 can be used to switch off or reduce the above powers. Consequently, it may be possible in any one of the embodiments described herein to reduce power consumption and/or to display further images with the above mentioned display image only when the user is interacting with the device. (Such a further image may be a sub-image that replaces, or is overlaid on (similarly to a water mark), a portion of the displayed image, or it may be an image that substantially replaces the entire displayed image. For example, if the further image fully overlaps the displayed image, the further image could be a low-power screen saver, the further image being adapted to reduce the required projection power relative to a higher complexity image. Where the further image is a sub-image, this may be a menu or a control button such as stop, fast forward, rewind, start, pause etc. Such a further image may be displayed (e.g., under control of the controller) in response to any detection signal described herein). Thus, embodiments may provide power saving features and/or a better interface for the user.

Figure 3A:
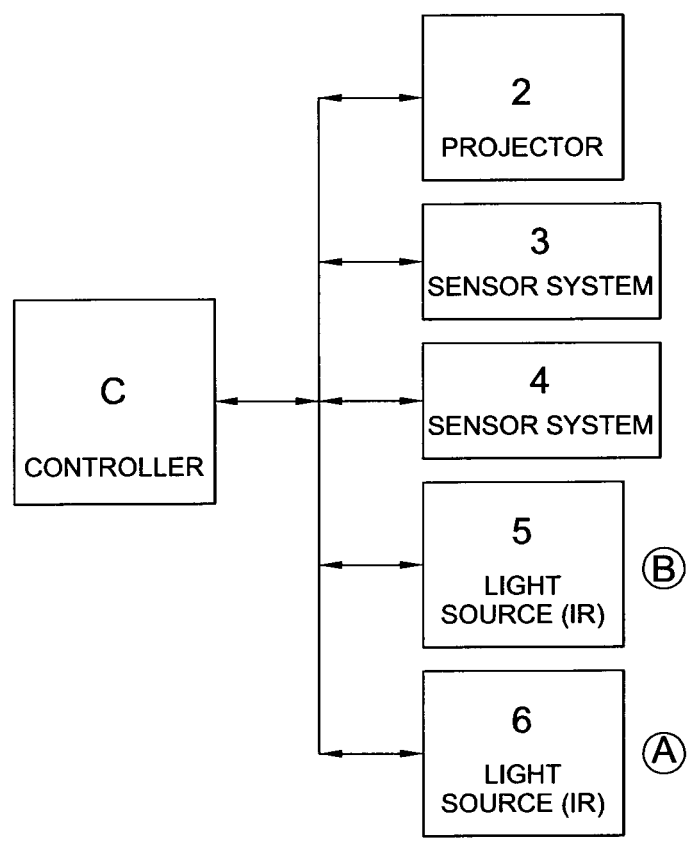
FIG. 3a shows a basic block diagram of elements relating to FIGS. 1 and 2.

FIG. 3a shows a basic block diagram of elements described above in relation to FIGS. 1 or 2. It is noted that, in some embodiments, the sensor systems 3 and 4 may be a combined system that multiplexes in wavelength or time sensing and/or projecting of light of the distributions. In more detail, FIG. 3a shows that the light sources may be infra-red. (It is noted that any indication of direction(s) of signal transmission between blocks in any block diagram of this specification is purely for example only and does not require bidirectional transmission on any link).

The sensor system 3 may be a multi-pixel power sensor such as a camera for calculating location (position). A second sensor is provided for the sensor system 4, this may be a single pixel or at least have a lower number of pixels than the sensor(s) of system 3. Thus, the sensor system 3 may be suitable for detecting location of a touch while the system using the second sensor may be suitable merely for detecting presence or motion. The light source 6 may provide a substantially two-dimensional sheet just above the surface where the image is displayed, this sheet being used to do the touch sensing. For the second light source 5, a further substantially two-dimensional sheet of light may be protected or alternatively the distribution may be a three-dimensional cone or volume of light.

Figure 3B:
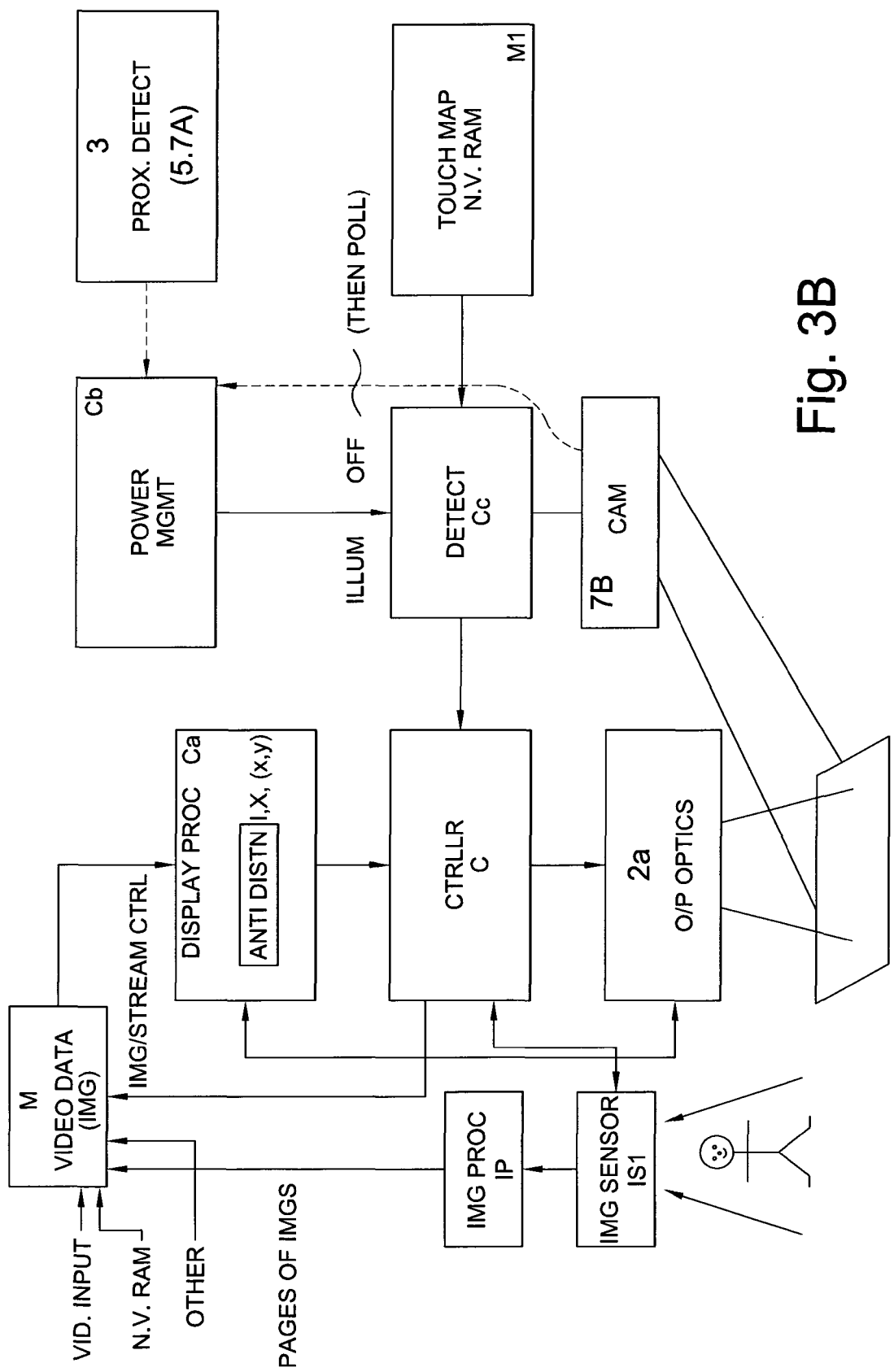

A more detailed block diagram of a further embodiment having any of the above features discussed in relation to FIGS. 1-3, and having corresponding elements, is shown in FIG. 3b. This detailed arrangement may be implemented within a consumer electronic device such as a camcorder, computer, mobile phone etc.

As may be found in any one of the embodiments described herein, a memory M is provided for image or video data. The image data/pages may be derived from a video input, non-volatile ram storage or any other source. (The image sensor IS1 is optional and may be present in a device for recording video or still images, such as a camera or camcorder; the image processor IP is a further optional part associated with the image sensor IS1). The memory may be a self-contained unit or found within the projector or the controller C.

The output optics 2a are generally associated with the projector 2. The display processor Ca, power management Cb and detect unit Cc are all associated in FIG. 3b with the controller C. However, they may be provided in other units coupled to the controller C. A proximity detect block corresponding to a sensor system 3 is shown coupled to the power management block Cb and may comprise the light source 5 and detector 7a. Furthermore, an output from a detector 7b in the form of a camera for detecting location of a touch is shown coupled to the power management block Cb. On the basis of these two inputs, the power management can control illumination of the first distribution for touch and/or of the displayed image off, or at least reduce the power used for these processes. The illumination may be controlled off after a period of absence of touch detects and the proximity detector may be pulled thereafter until proximity is detected so that the illumination can be turned back up to full power.

FIG. 3b further shows a memory M1 that may be used to map locations of detected touches to locations of the preferably un-distorted input image so that anti-distortion compensation can be formed. The touch map memory M1 may be used to implement a look up table for anti-distortion compensation.

Figure 3C:
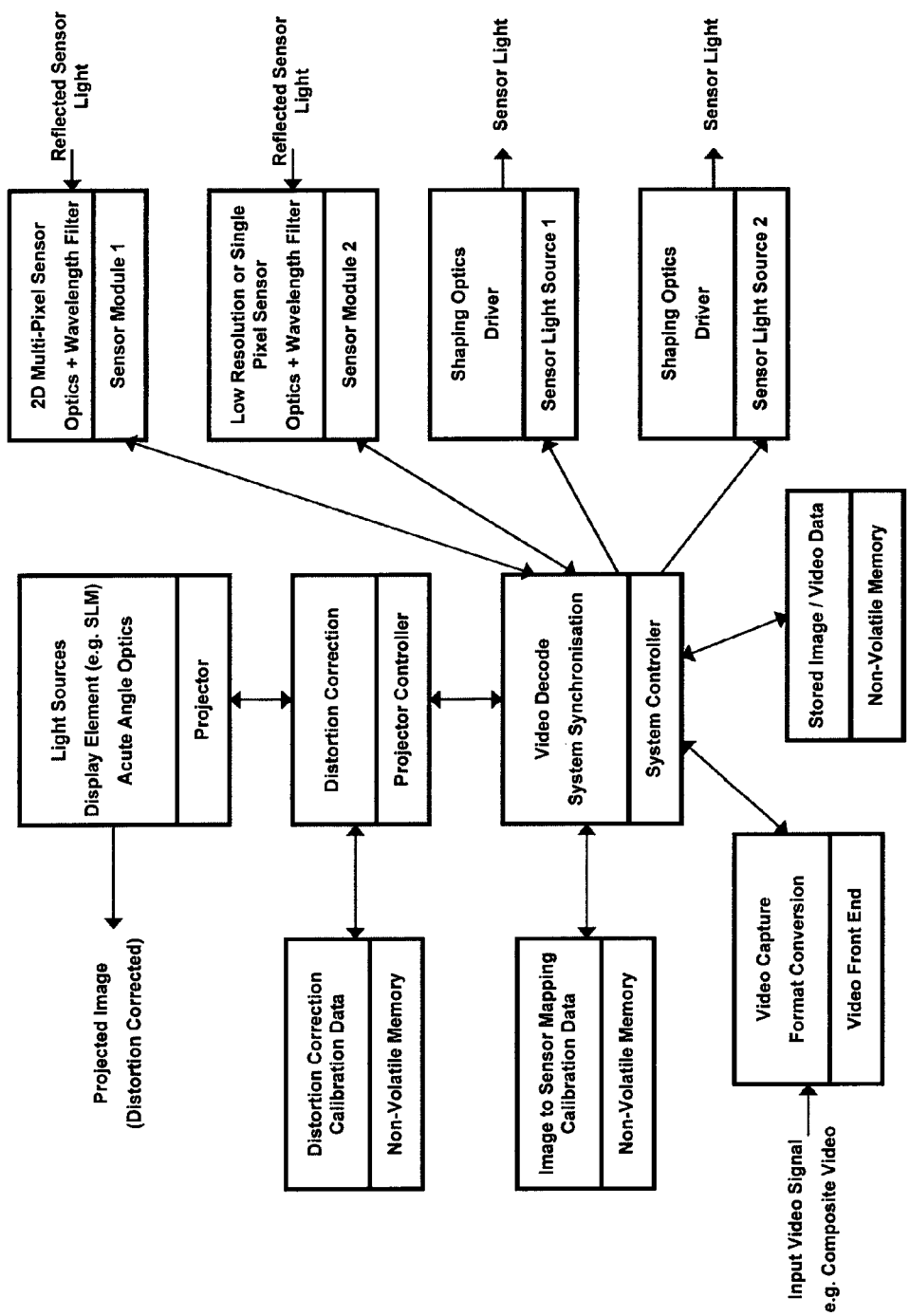
FIG. 3c shows a more detailed block diagram of an embodiment.

FIG. 3c shows a yet more detailed block diagram that may correspond to elements of any one of the embodiments described in this specification.

FIG. 4 shows a timing diagram for illustrating a first mode of operation of any one of the embodiments described herein. The mode is particularly advantageous in an embodiment where the above power management is implemented. The upper trace of FIG. 4 shows relatively high power in the first distribution when projection from the light source 6 is active. The lower trace shows lower power in the second light distribution due to low duty cycle of projection from the light 5. In other words, FIG. 4 shows that the first light source for touch sensing by means of the distribution d1 may provide a relatively high power light distribution when active, in comparison to the average power of the second distribution generated by the other light force. In the case shown in FIG. 4, the lower power may be due to a lower duty cycle where the second distribution is pulsed on and off repetitively. (Pulsing of one or more of the distributions in any embodiment described herein may enable rejection of at least some of the ambient light in a corresponding sensor system detection, particularly where a PLL is used as further described herein. Where pulsing is used, the background/ambient signal level may be read as frequently, preferably twice as frequently, as the pulsing of the corresponding light source).

As further shown in FIG. 4, while a hand or other object is present as detected by the touch and/or presence sensor system, the high-power first distribution source is maintained on. However, when absence of such an object is detected, the higher power source is turned down or switched off and polling for proximity begins by pulsing the lower power second distribution d2. When proximity is detected in the distribution d2, because the hand or other object has returned, the relatively higher power first distribution source for touch sensing is switched back to full power operation once more.

FIG. 5 shows a timing diagram of multiplexing of detection in the time domain. This may be used in any one of the embodiments to reduce the component count required for the device, e.g., by requiring a single light source and/or single sensor system. The upper trace shows projection in the lower (preferably infra-red (IR)) layer. The lower trace shows projection in the upper (IR) layer. As shown in FIG. 5, the light distributions d1 (lower IR layer) and d2 (upper IR layer) are switched to full power alternately. In this case, a single sensing system or even sensor may be configured to provide touch and presence detection signals synchronous with the alternating, such that the identification of each signal as being of touch or presence may be identified at least by the timing of the detection.

Figure 6:
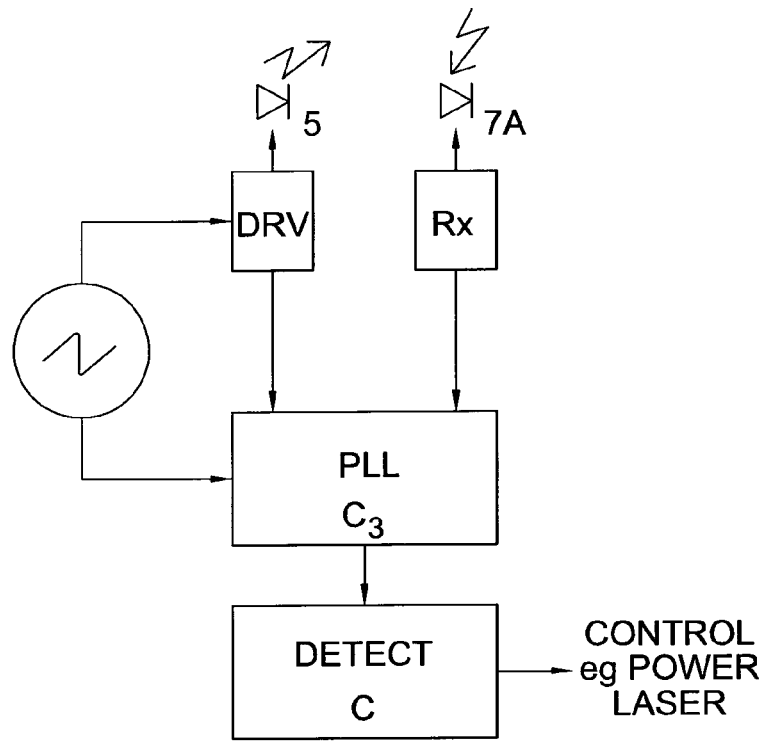
FIG. 6 shows an arrangement including a phase locked loop for synchronising distribution projection and receiving of detection signals in an embodiment.

With further regard to pulsing of the distribution d2, or for that matter of any other distribution such as d1 or any further distribution where implemented for example to save power, FIG. 6 shows that a phase locked loop (PLL) may be used to synchronise the distribution projection and receiving of light signals for detection such that, for example, a power laser, may be controlled accordingly. An advantage of such an implementation may be reduction of signal to noise ratio in the detection signals, since the sensor output can be filtered to obtain detection signals occurring at the same frequency and/or phase as the distribution pulsing, for example. The PLL may be part of the controller c for acting on the detection, or may be in a different device component.

Figure 7:
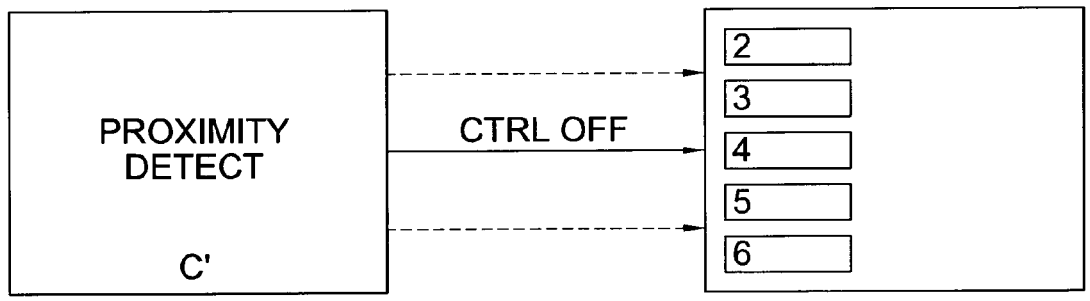
FIG. 7 shows how a controller C may determine a proximity detect signal in an embodiment.

FIG. 7 shows that, in any of the embodiments described herein, the controller C may determine a proximity detect signal and on this basis control one or more elements of the device to be switched on/off or switched to a lower/higher power mode. A plurality of such control signals may be provided, for example for controlling pre-determined touch sensor elements such as the light distribution d1 light source off or for tuning the projector 2 or at least the light source thereof off.

Figure 8:
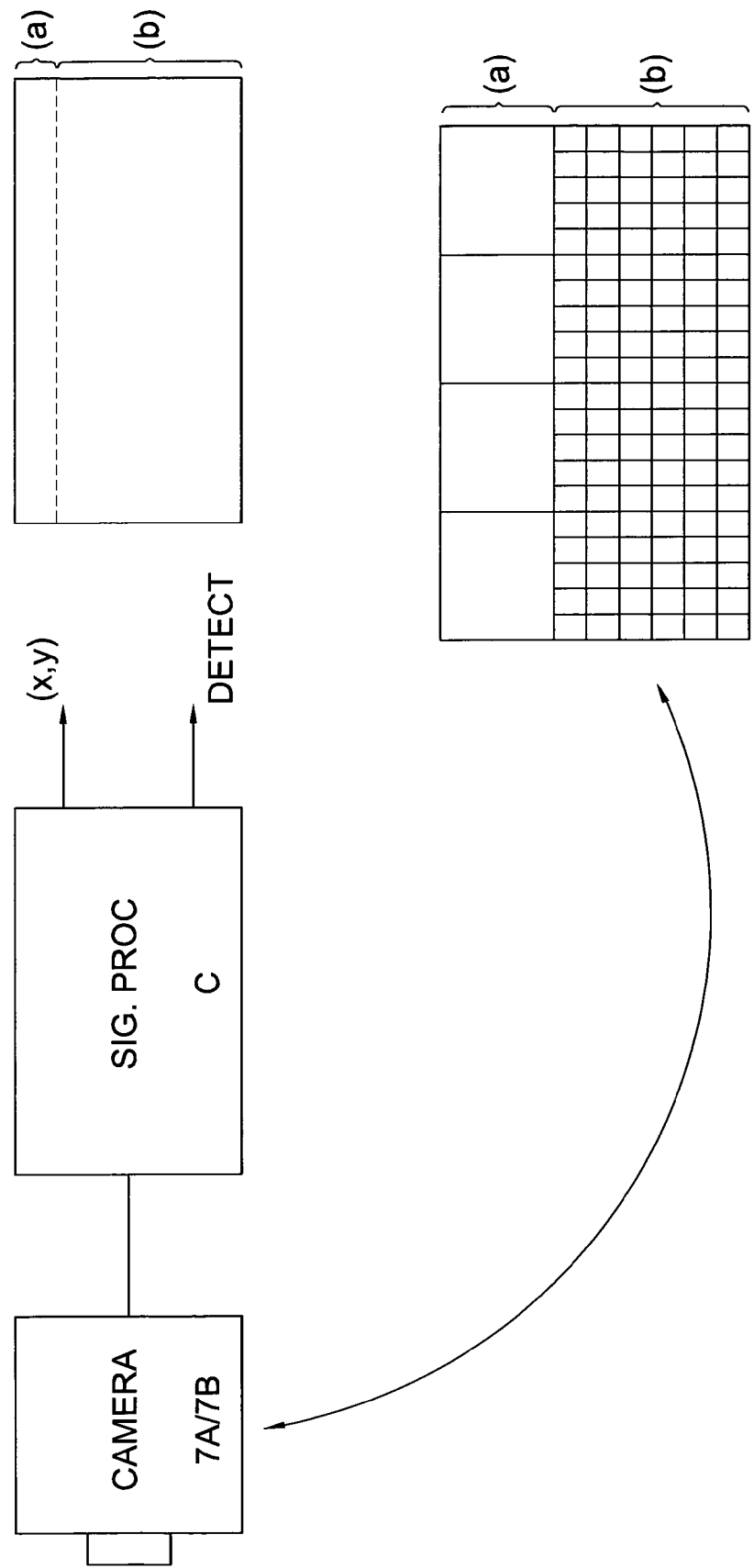
FIG. 8 illustrates a shared a multi-pixel sensor in an embodiment.

FIG. 8 illustrates a principle applicable in any one of the embodiments described herein, wherein the sensor systems 3 and 4 may share a multi-pixel sensor. The camera functions as the sensor 7a, 7b and has an array of pixels that may have a grid format such as that shown in the lower portion of FIG. 8. A signal processor which may be found in the controller c outputs on the basis of the camera output a location such as co-ordinates (X,Y) and a detection signal. (The location may even indicate which distribution the location has been detected in). As shown in FIG. 8, the resolution of the pixels used for proximity detector detection (shown at the top of the grid) may be lower than those used for touch location sensing. As shown in the top right diagram of FIG. 8, the controller may have knowledge of co-ordinate or locations corresponding to mere proximity and those corresponding to a detected touch location on the displayed image. Furthermore, the controller may have memory and/or processing for mapping the displayed image co-ordinates to input image regions including to compensate for distortion due to the acute angle or curvature of the surface.

Figure 9:
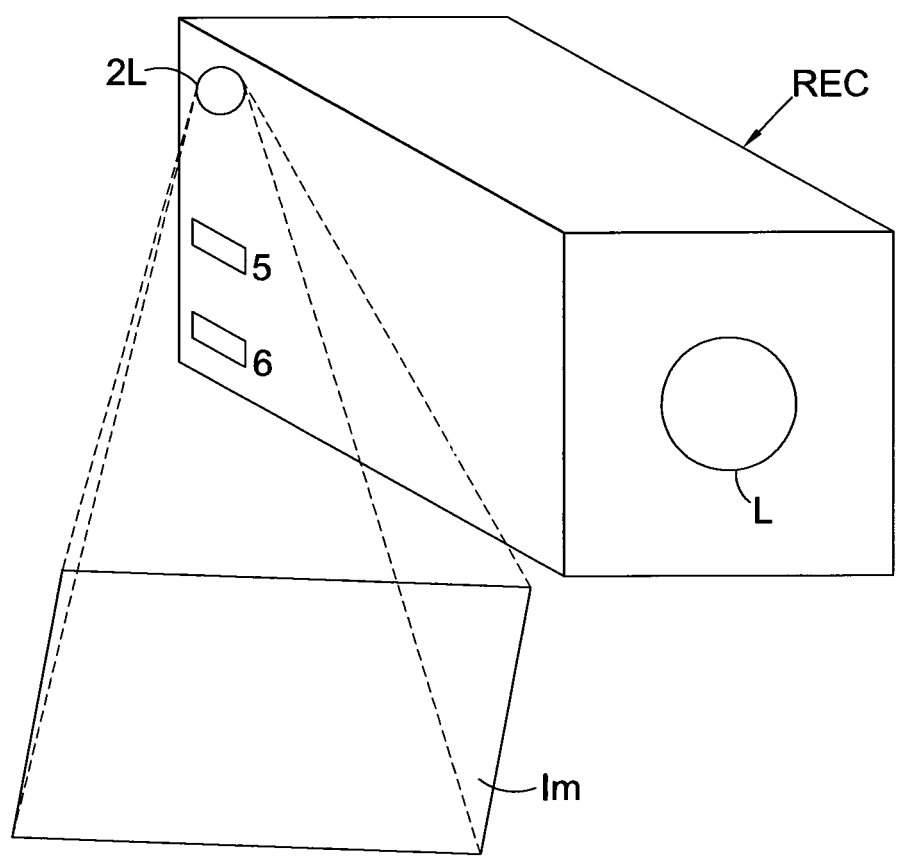
FIG. 9 shows a consumer electronics device such as a camcorder including a touch sensitive image display device.

FIG. 9 shows a consumer electronics device REC such as a camcorder including a touch sensitive image display device of any one of the embodiments described herein. In FIG. 9, there is shown an optional lens of the device for recording video, a output optics lens of a projector 2 of the touch sensitive image display device, the display image Im, and light sources 5, 6 (which may be combined, i.e. comprise a single, shared light source). Such a device may include elements of any embodiment described herein in any combination, in particular those of the block diagrams described.

The following relates to the above-mentioned anti-distortion compensation and is applicable in any embodiment described herein, in particular those using an SLM and in particular holographic projection.

In embodiments of a device using an SLM as describe above, especially where diffraction is employed, light from the entire illuminated area of the SLM may be directed into the distorted target image field. Moreover, the displayed image is substantially focus-free; that is the focus of the displayed image does not substantially depend upon the distance from the image projection system to the display surface. A demagnifying optical system may be employed to increase the divergence of the modulated light to form the displayed image, thus allowing an image of a useful size to be displayed at a practical distance.

The field of the displayed image may suffer from keystone distortion, the trapezoidal distortion of a nominally rectangular input image field caused by projection onto a surface at an angle which is not perpendicular to the axis of the output optics. Thus the image projection system internally generates a target image to which the inverse distortion has been applied so that when this target image is projected the keystone distortion is compensated. The target image is the image to which a transform is applied to generate data for display on the SLM. Thus in some preferred embodiments the system also includes non-volatile memory storing mapping data for mapping between the input image and the target image.

To convert from the input image to the target image either forward or reverse mapping may be employed, but preferably the latter, in which pixels of the target image are mapped to pixels of the input image, a value for a pixel of the target image then being a assigned based upon lookup of the value of the corresponding pixel in the input image. Thus in some preferred embodiments the trapezoidal shape of the target image field is located in a larger, for example rectangular target image (memory) space and then each pixel of the target image field is mapped back to a pixel of the (undistorted) input image and this mapping is then used to provide values for the pixels of the target image field. This is preferable to a forward mapping from the input image field to the distorted target image field for reasons which are explained below. In either case, however, in some preferred embodiments the transform is only applied to the distorted, generally trapezoidal target image field rather than to the entire (rectangular) target image memory space, to avoid performing unnecessary calculations.

Where reverse mapping as described above, is employed preferably compensation is also applied for variations in per unit area brightness of the projected image due to the acute angle projection. Thus while diffraction from a given pixel of the SLM may contribute to substantially an entire displayed hologram (where holographic projection is used in an embodiment), nonetheless the diffracted light from this pixel will be distorted resulting in more illumination per unit area at the short-side end of the trapezoid as compared with the long-side end of the trapezoid. Thus in preferred embodiments an amplitude or intensity scale factor is applied the value of which depends upon the location (in two dimensions) of a pixel in the target image space. This amplitude/intensity compensation may be derived from a stored amplitude/intensity map determined, for example, by a calibration procedure or it may comprise one or a product of partial derivatives of a mapping function from the input image to the anti-distorted target image. Thus, broadly speaking, the amplitude/intensity correction may be dependent on a value indicating what change of area in the original, input image results from a change of area in the anti-distorted target image space (at the corresponding position) by the same amount.

As mentioned above, rather than a reverse mapping a forward mapping from the input image space to the distorted target image space may alternatively be employed. This is in general less preferable because such a mapping can leave holes in the (anti-) distorted target image where, in effect, the target image is stretched. Thus mapping pixels of the input image to pixels of the target image may not populate all the pixels of the target image with values. One approach to address this issue is to map a pixel of the input image to an extended region of the target image, for example, a regular or irregular extended spot. In this case a single pixel of the input image may map to a plurality of pixels of the target image. Alternatively once pixel values of the target image have been populated using pixels of the input image, pixels of the target image which remain unpopulated may be given values by interpolation between pixels of the target image populated with pixel values. Where a single input image pixel is mapped to an extended region of the target image, these extended regions or spots may overlap in the target image, in which case the value of a target image pixel may be determined by combining more particularly summing, the overlapping values (so that multiple input image pixels may contribute to the value of a single target image pixel). With this approach compensation for per unit area brightness variation is achieved automatically by the summing of the values of the extended spots where these spots overlap in the target image field.

Preferred embodiments of the image projection system provide a multi-colour, more particularly a full colour display. Thus red, green and blue laser illumination of the SLM may be employed, time multiplexed to display three colour planes of the input image in turn. However, since the projection system may operate by diffraction, the blue light diverges less than the red light and thus in preferred embodiments the target image also has three colour planes in which a different scaling is employed for each colour, to compensate for the differing sizes of the projected colour image planes. More particularly, since the red light diverges most, the target image field of the red colour plane is the smallest target image field of the three target image planes (since the target image has "anti-distortion" applied). In general the size of the target image field for a colour is inversely proportional to the wavelength of light used for that colour. In some preferred embodiments, however, rather than a simple scaling by wavelength being applied the distortion (more correctly anti-distortion) of each colour image plane may be mapped to a corresponding colour plane of the target image field using a calibration process which corrects for chromatic aberration within the projection system such as chromatic aberration within the projection optics, chromatic aberration caused by slight misalignment between rays for different colours within the optics, and the light.

The techniques employed in preferred embodiments of the projector, in particular the holographic techniques, facilitate miniaturisation of the projector. These techniques also facilitate handling of extreme distortion caused by projection onto a surface on which the projector is placed, this extreme distortion resulting from the geometry illustrated in later FIG. 1c in combination with the small size of the projector. Thus in some preferred embodiments the surface onto which the image is projected is no more than 1 m, 0.5 m, 0.3 m, 0.2 m, 0.15 m, or 0.1 m away from the output of the projection optics 102. Similarly in embodiments the distance from the output of the projection optics to the furthest edge of the displayed image is substantially greater than the distance from the output of the projection optics to the nearest edge of the displayed image, for example 50%, 100%, 150%, 200% or 250% greater. Depending upon the geometry the acute projection angle may be less than 70°, 65°, 60°, 55°, 50°, or even 45°.

The device may also provide a forward projection mode and incorporate a stand such as a bipod or tripod stand, and preferably also a sensor to automatically detect when the device is in its table-down projection configuration, automatically applying distortion compensation in response to such detection. However in some alternative arrangements rather than mechanically tilting the device, instead the projection optics may be adjusted to alter between forward and table-down projection. This could be achieved with a moveable or switchable minor, but an alternative approach employs a wide angle or fisheye lens which when translated perpendicular to the output axis of the optics may be employed to move from forward projection to table-down projection at an acute angle.

A mapping between the input image and the anti-distorted target image may comprise either an analytical mapping, based on a mathematical function, or a numerical mapping, for example, derived from a calibration procedure or both. As previously mentioned in some preferred embodiment target image pixels are mapped to input image pixels to lookup target image pixel values. Preferably the target image is also corrected for area mapping distortion and, in a colour system, preferably the different colour planes are appropriately scaled so that they reproduced in the projection surface at substantially the same size.

In preferred embodiments of the above described systems, devices and methods preferably an (AD)OSPR-type procedure (WO2007/031797) is employed to generate the hologram data. Thus in preferred embodiments a single displayed image or image frame is generated using a plurality of temporal holographic subframes displayed in rapid succession such that the corresponding images average in an observer's eye to give the impression of a single, noise-reduced displayed image.

Advantages of the above described embodiments may include providing a video application device wherein buttons for play, stop etc., may be overlaid on the displayed video imaging only when necessary so that the video can be comfortably viewed by the user when the user is not manually interacting with the device. Similar applies to devices which may have pop-up menus, which may in particular be context sensitive depending on a location of touch, and it is preferred that these menus only appear when the user is manually interacting. A further advantage is how to reduce power of a touch sensitive display device, this being achieved by using a lower power proximity sensing system that allows the higher power touch sensing system to operate at lower power or even "sleep" when the user is not manually interacting but, e.g. merely passively observing the displayed image. Such proximity detection may further allow the device to be activated merely by a user's hand or other object approaches the displayed image rather than only by direct touch activation. Thus, power saving and/or a better interface may be achievable.

It is particularly noted that the projector in any one of the embodiments described herein may be holographic since this may advantageously provide a wide through angle long depth of field and very substantial distortion correction with less loss of brightness/efficiency than in non-holographic projectors. These techniques are described in our UK patent application number GB0822336.4 filed on Dec. 8, 2008 hereby incorporated by reference in its entirety.

Thus in embodiments the mapping between a target image for display and an input image is described by a pair of polynomial expansions and, more particularly by two sets of polynomial coefficients for these expansions. If we refer to the target image space using coordinates (x', y'), and the input image using coordinates (x, y) then we can define a location (x, y) in the input image space as a pair of functions f', g' of the coordinates in the (anti-distorted) target image space, as follows:

$$f'(x', y') \rightarrow x \quad g'(x', y') \rightarrow y$$

Likewise:

$$f(x,y) \rightarrow x' \quad g(x,y) \rightarrow y'$$

For reasons explained further below, it is preferable that the mapping from the target to the input image rather than vice-versa is employed. An example pair of polynomial expansions is given below:

$$f'(x', y') = \sum_i \sum_j a_{ij} x^i y^j$$

$$g'(x', y') = \sum_i \sum_j b_{ij} x^i y^j$$

The first few terms of the polynomial expansion of f' are as follows:

$$f'(x',y') = \alpha_{00} + \alpha_{10}x + \alpha_{01}y + \alpha_{11}xy + \alpha_{20}x^2 + \ldots$$

where broadly speaking coefficient $\alpha_{00}$ defines position, $\alpha_{10}$ and $\alpha_{01}$ define scale, $\alpha_{11}$ defines skew, and $\alpha_{20}$ and so forth are higher order coefficients. The value of $\alpha_{ij}$ is dependent on the angle of projection $\theta$, on i and on j; the value of bij is similarly dependent on $\theta$, i and j. It can be helpful to consider (x, y) space as being "camera"—that is defining what it is desired to project.

In embodiments a single pixel of the target image may maps to a plurality of pixels in the input image. This can be appreciated because the distortion effectively shortens the nearer edge of the input image as compared with the more distant edge from the output optics. Therefore in some preferred embodiments the target image is constructed by stepping through the (x', y') positions in the target image and for each looking up the addresses of the corresponding pixels in the input image and using the values from these pixels to assign a value to the corresponding pixel in the target image. Where multiple input image pixels correspond to a single target image pixel the values of the input image pixels may, for example, be summed or some other approach may be employed for example selecting a value such as a mean, medium or mode value. Thus preferred embodiments apply an inverse mapping, from the target to the input image space. By contrast mapping from the input image to the target image can leave holes in the target image, that is pixels with unpopulated values. In this case a single pixel of the input image may be mapped to a regular or irregular spot with an extended size (over multiple pixels) in the target image, optionally with a super imposed intensity distribution such as a gaussian distribution.

Once the target image T(x', y') has been created a hologram H(X, Y) of the target image is generated to approximate the following expression:

$$H(X, Y) = \sum_{i=0}^{N-1} \sum_{j=1}^{N-1} T(x', y') \exp\left(\frac{-2\pi j(ix + jy)}{N}\right)$$

where N represents the number of pixels in the hologram in the X and Y-directions (here for simplicity, the same number). The region of the target image space outside the image may be filled with zeros and therefore in some preferred implementations the evaluation of H(X, Y) is performed over a window of target image space defined by the target image, for efficiency.

In the context of table-down holographic image projection to provide a multicolour/full colour display preferred embodiments of the system employ three differently scaled and/or distorted target images, one of each of the three laser colours red, green and blue-denoted R, G and B in the figure.

Thus in embodiments separate functions f', g' are provided for each colour, although in other embodiments a single target image/distortion map is employed and scaled according to the wavelength of the laser light used for the respective colour plane, more particularly scaled by 1/λ. It will be understood that each pixel of a hologram calculated from the target image contributes to substantially the whole displayed image, the displayed image is scaled in inverse proportion to wavelength—that is the blue image would be smaller because the blue light is diffracted less, and therefore the blue target image enlarged so that the projected images for the three colour planes substantially match inside.

Referring again to the polynomial expansions described above, for an inverse mapping, that is from target to input image space, where scaling is applied the (0,0) coefficients are not scaled, the (1,0) and (0,1) coefficients are scaled by reciprocal wavelength, and optionally the coefficients of higher power are scaled accordingly, for example the (1,1), (2,0), and (0,2) coefficients being scaled by $1/\lambda^2$ and so forth. Thus for example, for 440 nm blue light and 640 nm red light:

$$a_{10}^R \frac{640}{440} a_{10}^B.$$

In other embodiments, however, a set of functions $f^{R'}, g^{R'}, f^{G'}, g^{G'}, f^{B'}, g^{B'}$ is employed to correct for chromatic aberration, positioning of the different coloured lasers and the light. When mapping using a forward function from the input image to the target image space the scaling applied is to multiply rather than divide by wavelength and the above approaches are adapted mutatis mutandis.

It is further desirable to correct for changes in brightness per unit area which result from the distortion in acute-angle image projecting. One approach would be to calibrate for this change and provide an anti-distortion calibration map to apply similarly to that for spatial distortion. Another approach, however, is to determine an intensity scale factor as a function of position, for example by determining what change of area in the original, input image results from a change of corresponding area in the anti-distorted space of target image by the same amount. This can be determined by determining the derivative of the target image with respect to the input image in each of two orthogonal directions in the image plane, more particularly by calculating an intensity scale factor A(x', y') according to:

$$A(x', y') = \frac{\partial f'(x', y')}{\partial x} \cdot \frac{\partial g'(x', y')}{\partial y}$$

The skilled person will appreciate that in going from an input image pixel value to a target image pixel value, if the pixel value defines an intensity then this should be multiplied by (1/A) whereas if the pixel value defines amplitude then in going from the input image to the target image the amplitude is multiplied by $(1/\sqrt{A})$.

A different approach may, however, be employed when forward mapping from the input image to the target image space. In this case where an input image pixel is mapped to an extended area or spot in the target image space area correction may be performed automatically by adding the contributions from overlapping spots in the target image space—that is a target image pixel value maybe determined by adding pixel values from input image pixels whose extended spots overlap that target image pixel.

Furthermore, the use of a spatial light modulator such as a pixellated liquid crystal device, which may be transmissive or reflective, for displaying a target image based on the input image may allow the displayed image to be updated (e.g., scrolled, panned, zoomed) dynamically in response to touch and/or proximity/presence (or movement thereof).

The above-described methods, and responsive device control, may be implemented using processor control code on a data carrier, as previously described.

The techniques described herein have may applications which include, but are not limited to, touch-sensitive displays for the following: mobile phone; PDA; laptop; digital camera; digital video camera; games console; in-car cinema; navigation systems (in-car or personal e.g. wristwatch GPS); head-up and helmet-mounted displays e.g. for automobiles and aviation; watch; personal media player (e.g. photo/video viewer/player, MP3 player, personal video player); dashboard mounted display; laser light show box; personal video projector (a "video iPod (RTM)" concept); advertising and signage systems; computer (including desktop); remote control unit; an architectural fixture incorporating an image display system; more generally any device where it is desirable to share pictures and/or for more than one person at once to view an image.

Furthermore, the features described in the detailed description above may be present in any permutation in any embodiment. As described above, an embodiment may advantageously provide a combined input-output, i.e., interactive, display having a 3-D touch interface (i.e., one that is able to detect and respond to touch/presence of an object in different spatial regions). In particular, any above-described presence sensor system, which is not arranged to detect touch of the displayed image but merely presence and/or approach and/or location in a corresponding second distribution, may be provided to allow sleep and/or wake-up detection for any element of the device, in particular of the touch sensing system comprising light source for the first distribution and touch sensor system. Any number, e.g., 3, of presence sensing systems comprising a further distribution as described above may be present.

No doubt many other effective alternatives will occur to the skilled person. It will be understood that the invention is not limited to the described embodiments and encompasses modifications apparent to those skilled in the art lying within the spirit and scope of the claims appended hereto.

In conclusion, the invention provides novel systems, devices, methods and arrangements for display. While detailed descriptions of one or more embodiments of the invention have been given above, no doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A touch sensitive image display device for projecting a touch sensitive displayed image at an acute angle onto a display surface, the device comprising:
   a first non-visible light source to project a substantially two-dimensional first light distribution in a first plane;
   a second non-visible light source to project a substantially two-dimensional second light distribution in a second plane, wherein said second plane is different to said first plane;
   wherein said first and second planes are each above said display surface, and substantially parallel and non-intersecting;

a multi-pixel sensor system to remotely detect touch of an area of said surface within or adjacent to said displayed image by detecting light from said first distribution, and having an output to provide a first object detection signal;

said multi-pixel sensor system to remotely detect presence of an object at least partially within said second light distribution by detecting light from said second distribution, and having an output to provide a second object detection signal; and a controller having an input to receive said first object detection signal and an input to receive said second object detection signal and configured to control said touch sensitive image display device responsive to said signals, wherein said device is configured to multiplex projection of the first light distribution and projection of the second light distribution in said respective first and second planes.

2. The touch sensitive image display device according to claim 1, comprising:

at least one further light source to project a further substantially two-dimensional second light distribution in a further plane, wherein said further plane is different to each other said plane; and at least one further multi-pixel sensor system, each said further multi-pixel sensor system to remotely detect presence of an object at least partially within at least one said further light distribution by detecting light from said at least one further distribution, and having an output to provide a detected presence signal.

3. The touch sensitive image display device according to claim 2, wherein said device is configured to multiplex projection of the first light distribution, the second light distribution and at least one said further light distribution.

4. The touch sensitive image display device according to claim 1, wherein said multi-pixel sensor system to detect touch comprises a plurality of multi-pixel sensors each to remotely detect touch of an area of said surface within or adjacent to said displayed image, and having an output to provide a detected touch signal.

5. The touch sensitive image display device according to claim 1, wherein said multi-pixel sensor system to detect presence comprises a plurality of multi-pixel sensors each to remotely detect presence of an object at least partially within said second light distribution, and having an output to provide a detected presence signal.

6. The touch sensitive image display device according to claim 1, wherein said light source to project said first light distribution is said light source to project said second light distribution.

7. The touch sensitive image display device according to claim 1, wherein said first plane and said second plane are substantially parallel planes.

8. The touch sensitive image display device according to claim 1, wherein said multiplexing is wavelength multiplexing.

9. The touch sensitive image display device according to claim 1, wherein said multiplexing is time multiplexing.

10. The touch sensitive image display device according to claim 9, wherein said responsive controller is configured to read said first object detection signal and said detected presence signal in synchronism with said time multiplexing.

11. The touch sensitive image display device according to claim 9, wherein said controller is configured to perform said responsive control by distinguishing between said receiving of said first object detection signal and said receiving of a detected presence signal on the basis of a timing of receiving a said signal.

12. The touch sensitive image display device according to claim 11, configured to determine an action to be initiated by said responsive control on the basis of said distinguishing.

13. The touch sensitive image display device according to claim 9, further comprising moveable optics to alternately project said first light distribution and said second light distribution.

14. The touch sensitive image display device according to claim 13, wherein said moveable optics comprises a rotatable mirror.

15. The touch sensitive image display device according to claim 1, wherein said multi-pixel sensor system to detect touch is to detect a location of said touch and said responsive control performs an action determined on the basis of said detected touch location and controls said device to perform said action.

16. The touch sensitive image display device according to claim 1, wherein said multi-pixel sensor system to detect presence is to detect a location of said presence and said responsive control performs an action determined on the basis of said detected presence location and controls said device to perform said action.

17. The touch sensitive image display device according to claim 15, wherein said action comprises selecting a menu on the basis of said detected presence location and displaying said selected menu.

18. The touch sensitive image display device according to claim 1, wherein said sensor system to detect touch is configured to detect light scattered from said first light distribution.

19. The touch sensitive image display device according to claim 1, wherein said sensor system to detect presence is configured to detect light scattered from said second light distribution.

20. The touch sensitive image display device according to claim 1, wherein said controller is configured to detect hovering of a said object by detecting absence of a said touch detection and occurrence of a said presence detection on the basis of said signals.

21. The touch sensitive image display device according to claim 1, further comprising a spatial light modulator (SLM) and a controller to control said SLM, on the basis of data defining said displayed image, to replay a target image distorted to compensate for projection onto said surface at said acute angle.

22. The touch sensitive image display device according to claim 1, wherein a multi-pixel sensor of said multi-pixel sensor system to detect touch is a multi-pixel sensor of said multi-pixel sensor system to detect presence.

23. The touch sensitive image display device according to claim 1, wherein said multi-pixel sensor system to detect touch is configured to use pixels of said multi-pixel sensor and said multi-pixel sensor system to detect presence is configured to use other pixels of said multi-pixel sensor.

24. A consumer electronic device such as a camcorder, camera, music player, mobile phone, media player or computer, comprising the touch sensitive image display device according to claim 1.

25. A touch sensitive image display device for projecting a touch sensitive displayed image at an acute angle onto a surface on which the device is placed, the device comprising:

a first non-visible light source to project a substantially two-dimensional first light distribution in a first plane;

a second non-visible light source to project a substantially two-dimensional second light distribution in a second plane, wherein said second plane is different to said first plane;

a multi-pixel sensor system to remotely detect location of touch of an area of said surface within or adjacent to said displayed image by detecting change of said first distribution, and having an output to provide a first object location signal;

a multi-pixel sensor system to remotely detect location of an object at least partially within said second light distribution, and having an output to provide a second object location signal;

a controller having an input to receive said first object location signal and an input to receive said second object location signal, and configured to control said device responsive to said first object location signal and to control said device responsive to said second object location signal.

26. The touch sensitive image display device of claim 25, wherein at least one said output to provide a detected location signal is configured to indicate a light distribution of said location detection.

27. The touch sensitive image display device of claim 25, comprising:

at least one light source to project at least one further light distribution;

said multi-pixel sensor system to remotely detect location of an object at least partially within the or each said further light distribution, and having at least one output to indicate a said further distribution and to provide a signal indicating a said location of said object in said indicated further distribution.

28. The touch sensitive image display device of claim 25, wherein the controller is configured to select an action on the basis of at least one of said signals, and to control said touch sensitive image display device to perform said action.

29. The touch sensitive image display device of claim 28, wherein the controller is configured to select said action further on the basis of at least one said indication of light distribution.

30. The touch sensitive image display device of claim 25, wherein said touch sensitive image display is operable by a user's finger as a joystick.

31. The touch sensitive image display device of claim 25, wherein said touch is a touch by a user's finger.

32. The touch sensitive image display device of claim 25, wherein said object is a user's finger.

33. The touch sensitive image display device of claim 25, wherein the controller is further configured to perform a said responsive control on the basis of a rate of change of at least one said detected location.

34. The touch sensitive image display device of claim 25, wherein the controller is further to configured to perform a said responsive control on the basis of a direction of change of at least one said detected location.

35. The touch sensitive image display device of claim 25, wherein the controller is further configured to perform a said responsive control on the basis of a locus of change of at least one said detected location.

36. The touch sensitive image display device of claim 25, wherein the controller is further configured to perform a said responsive control on the basis of difference between two said detected locations.

37. The touch sensitive image display device of claim 25 wherein the controller is further configured to perform a said responsive control on the basis of a rate of change of difference between two said detected locations.

38. The touch sensitive image display device of claim 25, wherein a said responsive control controls said touch sensitive image display device to update or move at least a portion of said displayed image.

39. The touch sensitive image display device of claim 25, wherein a said responsive control controls said touch sensitive image display device to display a further image adjacent to or at least partially overlapping said displayed image.

40. The touch sensitive image display device of claim 25, wherein a said multi-pixel sensor system comprises at least one multi-pixel sensor.

41. The touch sensitive image display device of claim 25, wherein a said sensor of said multi-pixel sensor system to detect touch is a said sensor of said multi-pixel sensor system to remotely detect location of an object.

42. The touch sensitive image display device of claim 25, further comprising an anti-distortion system to map a said detected location of touch to a portion of said input image.

43. The touch sensitive image display device of claim 25, wherein at least one said light source is another of said light sources.

44. A consumer electronic device such as a camcorder, camera, music player, mobile phone, media player or computer, comprising the touch sensitive image display device according to claim 25.

* * * * *